United States Patent [19]

Oliver

[11] Patent Number: 5,188,550
[45] Date of Patent: Feb. 23, 1993

[54] APPARATUS AND METHOD FOR CREATING A FLOATABLE THERMAL AND EVAPORATION BARRIER

[76] Inventor: Wynn W. Oliver, 525 Los Cerros Dr., Greenbrae, Calif. 94904

[21] Appl. No.: 709,209

[22] Filed: Jun. 3, 1991

[51] Int. Cl.$^5$ .................................................. F24J 3/02
[52] U.S. Cl. .......................................... 441/1; 4/498; 126/567
[58] Field of Search ......................... 441/1, 12, 28, 29; 4/498, 499, 503, 505; 126/415

[56] References Cited

U.S. PATENT DOCUMENTS

| | | |
|---|---|---|
| 2,553,798 | 5/1951 | Van Deventer ...................... 441/28 |
| 3,998,204 | 12/1976 | Fuchs et al. . |
| 4,109,325 | 8/1978 | Shuff . |
| 4,270,232 | 6/1981 | Ballew . |
| 4,458,668 | 7/1984 | Sheldon . |
| 4,467,786 | 8/1984 | Sorensen . |
| 4,579,536 | 4/1986 | Cameron ................................ 441/28 |
| 4,582,048 | 4/1986 | Sorensen . |
| 4,749,606 | 6/1988 | Moore . |

*Primary Examiner*—Jesus D. Sotelo
*Assistant Examiner*—Stephen P. Avila
*Attorney, Agent, or Firm*—Flehr, Hohbach, Test, Albritton & Herbert

[57] ABSTRACT

A device (20) for reducing evaporation and energy transfer between fluids, the surface (12) of which is exposed to environmental elements. A plurality of buoyant, homogenous evaporation devices (20) are randomly deployed into a body of fluid (10) whereby the devices (20) aggregate to provide a substantially contiguous, gapless blanket barrier. Devices (20) have predetermined number of substantially planar, polygonal, vertical side walls (22) of substantial height dimension. During undulatory conditions of the fluid surface (12), surface-to-surface engagement around the periphery of device (20) with the adjacent vertical walls (22) of similarly formed devices (20) is slidably maintained along the substantial height dimension of side walls (22). The aggregate of devices (20) is kept intact, requiring only minimal lateral pressure, to maintain a substantial evaporation retardation barrier regardless of whether the fluid surface (12) is subject to undulatory conditions or is uniform.

8 Claims, 2 Drawing Sheets

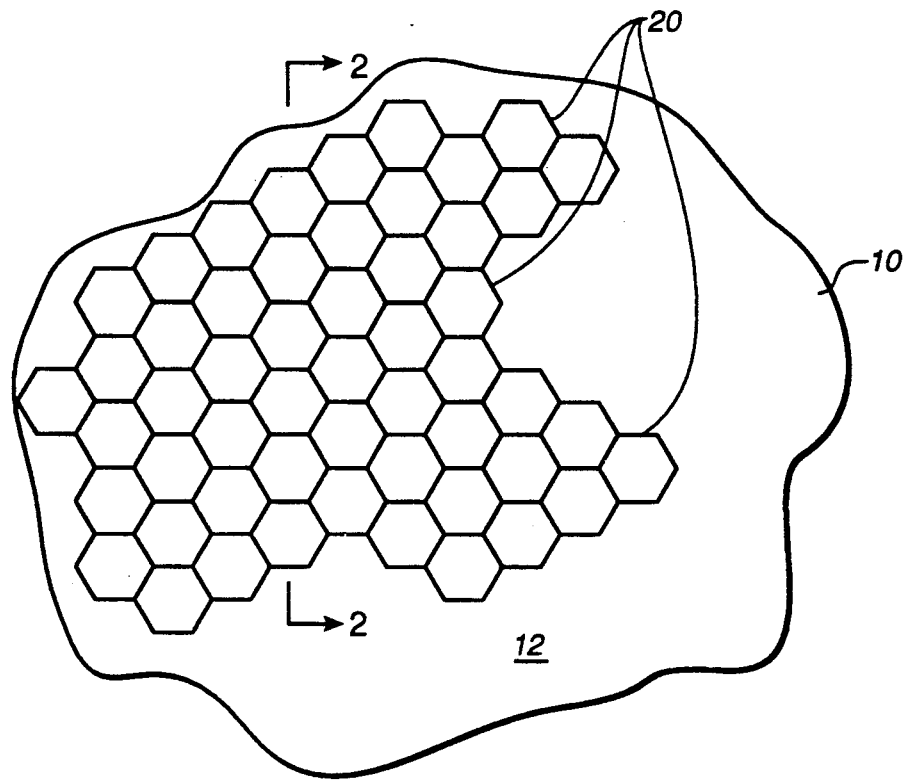
FIG._1
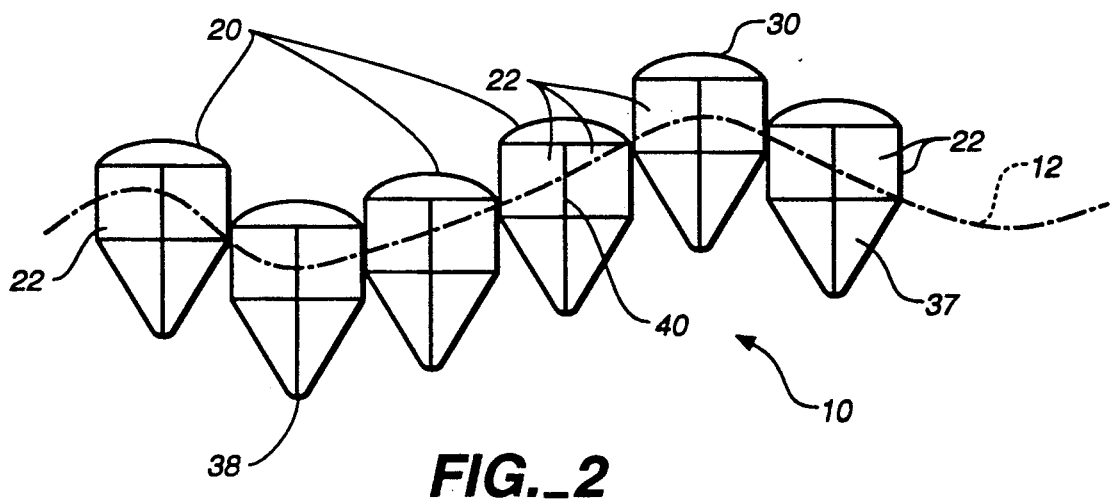
FIG._2

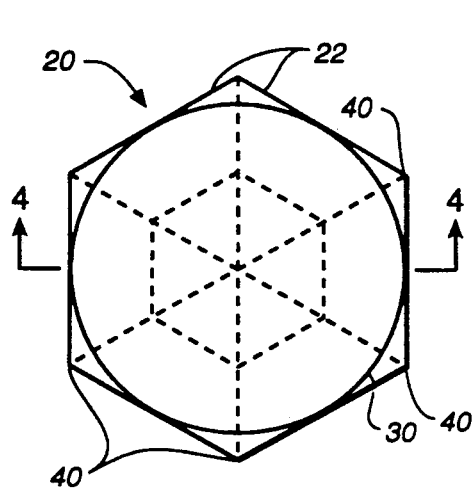
FIG._3
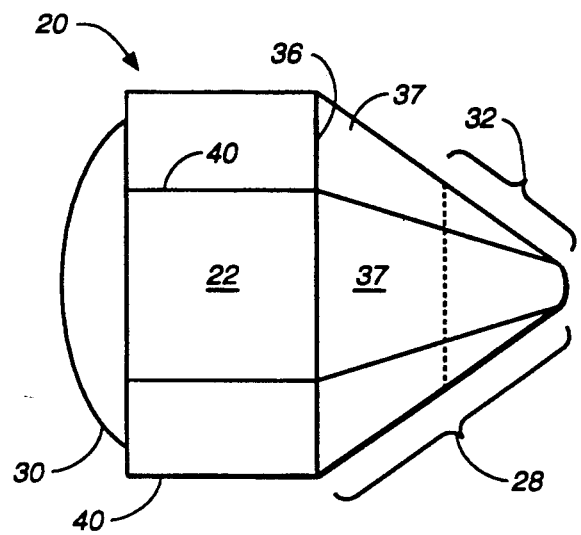
FIG._5
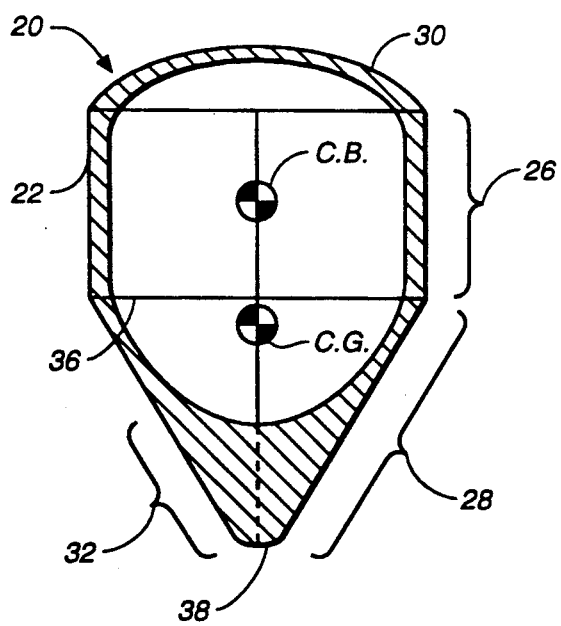
FIG._4

APPARATUS AND METHOD FOR CREATING A FLOATABLE THERMAL AND EVAPORATION BARRIER

TECHNICAL FIELD

The present invention relates, in general, to an apparatus for reducing evaporation and energy transfer, and more particularly, relates to a plurality of homogenous, buoyant devices adapted to aggregate and form a substantial evaporation and energy transfer reduction barrier.

BACKGROUND OF THE INVENTION

Impeding the transfer of energy between fluids or reducing the evaporation of liquids is a major concern continually confronting both industry and the public. This is especially true in the chemical and petroleum industries where substantial sums of money are lost yearly due to the evaporation of volatile substances. Moreover, environmentalists persistently importune pertinent government bodies to strictly regulate the industries emitting pollutants and toxins. Thus, evaporation poses both a financial and, more importantly, an environmental burden on industry and society.

In still other instances, evaporation of non-toxic as well as toxic substances is also problematic. In regions permanently subjected to arid weather or areas temporarily experiencing unusual drought conditions, the reduction of evaporation or the control of energy transfer may be critical to the viability of the region. Therefore, the ramifications of liquid evaporation may be far more extensive than merely experiencing economic or environmental damage.

To help alleviate some of the problems discussed herewith, rigid or semi-rigid custom fit covers have been developed to insulate or reduce exposure of the top surface of the liquid from the atmosphere. For example, U.S. Pat. No. 4,109,325 to Shuff discloses an inflatable swimming pool cover system which slows evaporation while simultaneously reducing heat loss.

These covers, however, must be custom fit to effectively cover the appropriate area. Therefore, irregularly shaped surface areas pose problems in themselves. For example, bodies of fluid having sloped sides experience surface area and shape alterations as the fluid level changes. Thus, custom fit covers may no longer properly fit as the fluid level increases or decreases. Further, manufacture and repair are costly and significantly more difficult. Ruptures, alone, may render the rigid as well as semi-rigid covers inoperable or ineffective. Lastly, enormous assistance is required to deploy the cover over the surface and position it properly.

Consequently, systems have been developed which more easily cover irregularly shaped surface areas as well as provide an easier method of deployment. One prior art evaporation and energy transfer reduction approach is to introduce a plurality of floatable devices which collectively cover a substantial portion of the surface area of the liquid body. These systems reduce the surface exposure and, thus, evaporation. Furthermore, the ease of deployment is not bias towards symmetrical shapes; that is, irregularly shaped bodies of fluid are just as easily blanketed as are symmetrical ones.

Typical of such an approach is the device set forth in U.S. Pat. No. 3,998,204 to Fuchs et al. This reference describes a floatable ball having contoured flat surfaces surrounding its equatorial plane. The ball is rigid and contains ballast in its bottom portion so that its flat surfaces are vertically oriented and juxtaposed to each other. When the liquid surface is uniform or non-oscillatory, the collective surface-to-surface engagement between the equatorial planes of these balls provides a substantially gapless or uninterrupted floating ball blanket.

Such an approach, however, becomes problematic when the fluid surfaces are no longer uniform. In large bodies of liquid, weather conditions or natural currents foster undulatory or erratic surface conditions. Moreover, these conditions are easily simulated using artificial means such as machinery or human activity. The difficulties lie when the amplitude of the fluid oscillations surpass the height of the surface-to-surface engagement of the abutting equatorial planes of neighboring balls. In these situations, the gapless surface will be interrupted and the efficiency of the floatable blanket substantially diminished. For example, in Fuchs et al., the equatorial mating plane comprises a rather small surface height because of the physical nature of a sphere. Thus, the system according to Fuchs et al. has its maximum effectiveness only when the fluid surfaces conditions are favorable and substantially uniform. Such conditions are not plausible in larger bodies of fluid which are exposed to environmental elements.

A partial attempt to solve the above-mentioned problem is disclosed in U.S. Pat. No. 4,582,048 to Sorensen. This approach distributes a plurality of coverites which comprise a flexible material enclosing a fluid. Each coverite engages in surface-to-surface contact with its neighboring coverite mutually conforming its flexible wall to that of its neighbors. Thus, the individual units, when conformed, are not homogenous and the blanket is in a constant state of evolution. When used correctly and when confronted with an undulatory fluid surface, the coverites provide a formidable barrier which resists the blanket interruptions which Fuchs et al. fails to address.

The primary drawback of an approach such as is disclosed in Sorensen is that to mutually conform the flexible walls to that of its neighboring coverites, substantial lateral force is required to maintain a gapless, uninterrupted sealed barrier. Accordingly, either a substantial number of coverites must be deployed to overpopulate the liquid surface, thereby creating lateral forces, or a fixed barrier enclosing the deployment area must be constructed to provide the lateral resistance necessary to allow conformity between the flexible walls of neighboring coverites. In other words, without the appropriate lateral force, individual coverites will not mold their flexible walls to that of neighboring coverites. As a result, the system according to Sorensen will ineffectively create a thermal barrier and substantial gaps will exist.

Other prior art evaporation and energy reduction techniques and systems which cumulatively form a barrier are disclosed in U.S. Pat. Nos. 4,749,606; 4,467,786; 4,458,688 and 4,270,232. As is true of the above-mentioned prior art, these devices and techniques suffer barrier breach when confronted with undulatory surface conditions.

Accordingly, it is an object of the present invention to provide an improved device that will reduce surface evaporation and the transfer of energy between fluids by introducing a plurality of buoyant devices to the fluid surface which aggregate and cooperate to form a substantially gapless evaporation barrier at the surface of the fluid.

It is another object of the present invention to provide an improved device for maintaining a substantially gapless and uninterrupted barrier when subjected to undulatory or oscillatory fluid surfaces.

It is still another object of the present invention to provide a device that forms an effective evaporation and energy transfer barrier which requires only minimal lateral forces to keep the barrier intact and substantially gapless.

It is a further object of the present invention to provide a method and device for reducing fluid evaporation and energy transfer which is durable, compact, simple to deploy and construct, easy to maintain, and is economical to manufacture.

The device of the present invention has other objects and features of advantage which will become apparent from and are set forth in more detail in the description of the Best Mode of Carrying out the Invention and the accompanying drawing.

DISCLOSURE OF INVENTION

In summary, the evaporation and energy transfer reduction system of the present invention is particularly suitable for commercial or industrial applications. However, adaptation for domestic or household use is easily accommodated. The improvement in the buoyant evaporation reduction device of the present invention comprises, briefly, a relatively rigid body converging from the sides thereof to form an apex; weight means positioned proximate the apex forming ballast; and polygonal side walls intersecting along common edges which remain engaged around the periphery of the buoyant body during relative vertical displacements.

The polygonal side walls have a substantial height dimension relative to the buoyant body so that slidable engagement with adjacent walls of similarly formed neighboring devices provide a contiguous, gapless barrier, even during undulatory surface conditions.

The evaporation reduction device constructed in accordance with the present invention will be understood with reference to the following detailed description, together with additional objects and attendant advantages, taken in conjunction with the accompanying drawing.

BRIEF DESCRIPTION OF THE DRAWING

FIG. 1 is a top plan diagrammatic view of a body of fluid partially covered by an aggregate of evaporation devices constructed in accordance with the present invention.

FIG. 2 is an enlarged, side diagrammatic view taken substantially along the plane 2—2 in FIG. 1, illustrating the surface-to-surface mating technique in an undulatory fluid surface condition in accordance with the present invention.

FIG. 3 is a further enlarged, top plan view of the evaporation prevention device of the present invention.

FIG. 4 is a front elevational view, in cross section, of the device of the present invention taken substantially along the plane 4—4 in FIG. 3.

FIG. 5 is a side elevational view of the device constructed in accordance with the present invention.

BEST MODE FOR CARRYING OUT THE INVENTION

Reference will now be made in detail to the preferred embodiments of the invention, examples of which are illustrated in the accompanying drawings. While the present invention has been described with reference to a few specific embodiments, the description is illustrative of the invention and is not to be construed as limiting the invention. Similarly, although primarily constructed for use in covering irregularly shaped bodies of water, the evaporation reduction device and method of the present invention are applicable to a variety of fluids including toxic substances. Various modifications may occur to those skilled in the art without departing from the true spirit and scope of the invention as defined by the appended claims.

Turning now to the drawings, wherein like components are designated by like reference numerals throughout the various figures, attention is directed to FIG. 1. Here is provided a pond or some irregularly shaped body of fluid, generally designated 10, having a surface 12, best shown in FIG. 2. The evaporation prevention devices, generally designated 20, according to the present invention are viewed aggregating in the upper left corner of fluid body 10. As will be described in more detail below, devices 20 are buoyant, homogenous and relatively rigid.

Briefly, the upper body portion, generally designated 26 (FIG. 4), is either of relatively low density material or is substantially hollow, thereby, promoting buoyancy. Additionally, the lower body portion, generally designated 28, contains ballast or weight means 32 proximate apex 38 to maintain polygonal side walls 22 in a substantially vertical position. Accordingly, when device 20 is randomly introduced into fluid body 10, device 20 will bob from side-to-side until it comes to rest in position vertically oriented as shown in FIG. 2. Continued deployment of homogeneous devices 20 enables surface-to-surface engagement around the periphery of device 20 along a substantial height dimension with neighboring side walls 22 of similarly formed devices 20. Aggregation is further encouraged or fostered by undercurrents, eddies, wind or the like with only minimal lateral pressure or external assistance. This unification cooperates to produce a substantially contiguous, gapless packing of buoyant devices 20, collectively forming a barrier which insulates fluid surface 12 from exposure to the atmosphere. Accordingly, evaporation and heat loss are reduced as surface exposure is reduced. As can be seen in FIG. 1, this method and device are particularly effective when the perimeter of liquid 10 is irregularly shaped. Moreover, in fluid bodies 10 having gradually sloped side walls, decreases in fluid height will not degrade surface coverage because the individual devices will merely come to rest on the sloped surfaces.

As best may be viewed in FIG. 2, substantially vertical polygonal side walls 22 slidably engage around the periphery of neighboring devices 20 to form a substantially gapless barrier. Moreover, when an irregular, undulating fluid surface 12 exists, the system according to the present invention remains substantially gapless or contiguous. Fluid surface 12 is shown oscillating in a undulatory manner whereby vertical side walls 22 having a substantial height dimension relative upper body 26 slidably engage around common peripheries of similarly formed devices 20 to continuously maintain an effective evaporatory seal. Further, it is noted here that although FIG. 2 is two-dimensionally illustrated, the system according to the present invention is constructed for three-dimensional applications.

Referring now to FIGS. 3-5, device 20 is schematically represented. In the preferred embodiment, device 20 is relatively rigid and is either of relatively low density material or is substantially hollow for buoyant purposes. This is clearly illustrated in FIG. 4. In combination, weight means 32 located proximate apex 38 lowers the center of gravity (C.G.) of device 20 below fluid surface 12. Similarly, low density or substantially hollow body 20 raises the center of buoyancy (C.B.). In effect, the metacentric height, which is the vertical distance between the metacenter and the C.G., is increased. Statically, a greater metacentric height increases the buoyant stability of device 20 as well as its propensity to remain vertically upright when equilibrium is established. Thus, in accordance with the present invention, device 20 floats upright in a relatively stable position.

FIG. 4 illustrates device 20 in cross-section which is preferably a unibody structure having an upper body 26 comprising a predetermined number of polygonal, substantially vertical side walls 22 extend downwardly and intersect along common edges 40 which have a substantial height dimension. Thus, from the top plan view of FIG. 3 it can be seen that the perimeter of substantially vertical surfaces or walls 22 generally comprise a hexagon. It is then appreciated that when six other homogenous devices 20 encompass central device 20 in the most efficient manner, the fluid surface 12 may be closed off from the environment and a barrier, as described, is formed. The device of the present invention also can be formed with three vertical side surfaces meeting at common edges, since three-sided bodies also will produce gapless packing. It is essential, however, that substantially vertical side walls 22 mate together in a surface-to-surface fashion around the periphery of device 20 with neighboring similarly formed devices 20 which slidingly engage each other along the substantial height of common peripheries of upper body 26. According to the present invention, surface undulations will not encourage breach of the barrier because the slidable engagement of polygonal, substantially vertical side walls 22.

Therefore, the height of prism body 26 must at least be sufficient to withstand surface undulations attempting to sever the surface-to-surface engagement of mating side walls 22. For this reason, vertical side walls 22 intersect along common edges 40 having substantial height so that side walls 22 of adjacent similarly formed buoyant devices 20 will remain engaged around their peripheries during relative vertical displacements. It is also along substantially vertical walls 22 that fluid surface 12 is maintained. Thus, below the level line 12, all exterior surfaces will be submersed. The level of submersion, of course, is dependant on many factors such as the density of the fluid and the volumetric density of the device.

As best may be seen in FIG. 4, vertical sides 22 extend both above and below center of buoyancy (C.B.). This allows the buoyant device to both sink below and bob above fluid surface 12 while maintaining contact with adjacent planar sides of similar devices. Typically, the C.B. is located proximate the mid-height of sides 22.

Referring again to FIGS. 3 and 4, the details of the remaining structure are herein described. Polygonal side walls 22 of prism body 26 terminate at bottom edges 36. Henceforth, edges 36 preferably taper inwardly, terminating at a common focal point or apex 38. Therefore, in the preferred form, the lower portion of body 26 converges to apex 38 along planar surfaces 37, which form a regular prism body 28. It will be appreciated, however, that body 28 may further be conically shaped without departing from the true scope of the present invention.

Weight means 32 is disposed substantially proximate apex 38 of body 28. It will be understood that in the preferred embodiment, viewed in FIG. 4, weight means 32 comprises a substantially solid pyramid portion near apex 38. It should be noted here that weight means 32 could be composed of a material denser than device 20 itself if alternative buoyant properties are desired. For example, if device 20 were a unibody structure composed of plastic, weight means 32, also composed of plastic, may be an insufficient ballast. In this instance, weight means 32 would comprise a material denser than the material composing device 20. Preferably, however, weight means 32 is basically a substantially solid mass of the same material composing device 20.

Disposed atop prism body 26 is a dome portion, generally designated 30. The actual shape of dome 30 is relatively unimportant as dome 30 provides only minor functional aspects, for example, easing mass deployment by cooperating with apexes 38 to cause the devices to slide into side-by-side deployment.

As previously stated, it is desirable for the evaporation reduction device according to the present invention to be relatively buoyant; thus, device 20 is either of a relatively low density material or is substantially hollow. FIG. 4 illustrates a unibody device 20 having generally thin walls 22. Dome 30, disposed atop regular prism body 26 is relatively thin as well. However, the thickness of dome 30 must be sufficient to withstand impact forces generated during mass deployment.

Device 20, for example, may be comprised of glass because the density characteristics of glass are favorable in aiding ballast while permitting buoyancy in the hollow portions. Moreover, cost can be reduced. It will be understood, however, that the present invention may be any relatively rigid material, for example, plastics, just as long as the overall volumetric density is less than the liquid it occupies, so as to maintain buoyancy.

In an alternative embodiment of the present invention, a reflective coating may be disposed along the exterior surfaces of device 20, and dome 30 particularly. This reflective material acts to insulate the body of fluid 10 from environmental factors. For example, chilled fluids may be partially insulated from direct sunlight because the rays impinging on dome 30 will be reflected, thereby reducing radiation and conduction of energy. Accordingly, a relatively uniform fluid temperature is maintained.

While in the foregoing specification the present invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

Therefore, persons of ordinary skill in this field are to understand that all such equivalent structures are to be included within the scope of the following claims.

What is claimed is:

1. In a buoyant device for use with a plurality of similarly formed buoyant devices to produce a floating barrier, said device having a plurality of substantially vertically extending planar sides, with the number of said sides being selected to produce contiguous gapless packing of said buoyant devices when floating in side-by-side relation, the improvement comprising:
   a buoyant body being formed as a relatively rigid member converging from said sides to an apex;
   weight means positioned proximate said apex; and
   said side walls each being substantially parallel to each other and polygonal in shape with a substantial height dimension, and said side walls intersecting along common edges having a substantial height dimension so that side walls of adjacent buoyant devices of similar shape will remain in substantially gapless engagement around the periphery of said buoyant device during relative vertical displacements.

2. A buoyant device as defined in claim 1 wherein, said buoyant body is provided with six substantially vertical sides.

3. A buoyant device as defined in claim 1 wherein, said body converges to an apex along planar surfaces forming a pyramid, said surfaces originating from said sides.

4. A buoyant device as defined in claim 1 wherein, said buoyant body is substantially hollow above said apex and said weight means is provided by a substantially solid apex.

5. A buoyant device as defined in claim 4 wherein, said buoyant body is formed of a transparent material.

6. A buoyant device as defined in claim 5 wherein, said buoyant body is formed of glass.

7. A buoyant device as defined in claim 1 wherein, said buoyant body is formed of a sufficiently low density material to provide buoyancy and said weight means is formed of a sufficiently high density material to provide ballast.

8. A buoyant device as defined in claim 1 wherein, a top surface of said buoyant body is provided with a reflective coating.

* * * * *